US008961198B2

(12) United States Patent
Ferran Palau et al.

(10) Patent No.: US 8,961,198 B2
(45) Date of Patent: Feb. 24, 2015

(54) ELECTRICAL JUNCTION BOX CONNECTIONS

(71) Applicant: Lear Corporation, Southfield, MI (US)

(72) Inventors: Joan Ignasi Ferran Palau, Valls (ES);
Josep Maria Pares Caselles, Valls (ES);
Eduard Torrens Gavalda, Valls (ES);
Antonio Tomas Amenos, Valls (ES)

(73) Assignee: Lear Corporation, Southfield, MI (US)

( * ) Notice: Subject to any disclaimer, the term of this patent is extended or adjusted under 35 U.S.C. 154(b) by 101 days.

(21) Appl. No.: 13/908,122

(22) Filed: Jun. 3, 2013

(65) Prior Publication Data
US 2013/0330982 A1 Dec. 12, 2013

Related U.S. Application Data

(60) Provisional application No. 61/657,191, filed on Jun. 8, 2012.

(51) Int. Cl.
H01R 12/00 (2006.01)
H01R 4/58 (2006.01)
H01R 9/22 (2006.01)
B60R 16/023 (2006.01)
H01R 4/34 (2006.01)

(52) U.S. Cl.
CPC ............. H01R 4/58 (2013.01); H01R 9/226 (2013.01); B60R 16/0239 (2013.01); H01R 4/34 (2013.01); Y10S 439/949 (2013.01)
USPC .................. 439/76.2; 439/620.27; 439/949

(58) Field of Classification Search
USPC ..................... 439/76.2, 620.27, 949
See application file for complete search history.

(56) References Cited

U.S. PATENT DOCUMENTS

| 5,639,268 | A | 6/1997 | Julian et al. |
| 6,325,640 | B1 * | 12/2001 | Kasai ........................... 439/76.2 |
| 6,679,708 | B1 * | 1/2004 | Depp et al. ................... 439/76.2 |
| 6,719,572 | B2 * | 4/2004 | Seo et al. ..................... 439/76.2 |
| 7,347,733 | B2 | 3/2008 | Murakami |
| 7,549,872 | B2 * | 6/2009 | Akahori et al. .............. 439/76.2 |
| 7,614,886 | B2 * | 11/2009 | Choi ............................. 439/76.2 |
| 7,670,184 | B2 * | 3/2010 | Akahori et al. .......... 439/620.27 |
| 7,850,462 | B2 * | 12/2010 | Nakagawa .................... 439/76.2 |
| 8,350,151 | B2 | 1/2013 | Asao |
| 2008/0110662 | A1 * | 5/2008 | Akahori et al. ................. 174/59 |
| 2010/0051311 | A1 * | 3/2010 | Nakagawa ....................... 174/59 |
| 2011/0269320 | A1 * | 11/2011 | Roettger et al. ............. 439/76.2 |
| 2013/0037317 | A1 * | 2/2013 | Iwata et al. .................... 174/542 |

FOREIGN PATENT DOCUMENTS

JP         9050836 A      2/1997

* cited by examiner

Primary Examiner — Gary Paumen
(74) Attorney, Agent, or Firm — Brooks Kushman P.C.

(57) ABSTRACT

A junction box assembly is provided with a conductive boss having a first contact surface and a second contact surface spaced apart from the first contact surface. A pair of threaded conductive studs each extends from one of the contact surfaces. A housing is overmolded onto the boss so that the first contact surface, the second contact surface, and the pair of studs are exposed. A printed circuit board (PCB) is oriented in the housing. A busbar is oriented in the housing in electrical communication with the PCB. The busbar has a conductive tab with an aperture formed therethrough. One of the pair of studs is received within the aperture and the contact tab is in electrical communication with one of the first contact surface and the second contact surface.

20 Claims, 2 Drawing Sheets

ELECTRICAL JUNCTION BOX CONNECTIONS

CROSS-REFERENCE TO RELATED APPLICATIONS

This application claims the benefit of U.S. provisional Application No. 61/657,191 filed Jun. 8, 2012, the disclosure of which is incorporated in its entirety by reference herein.

TECHNICAL FIELD

Various embodiments relate to electrical junction boxes and electrical connections for electrical junction boxes.

BACKGROUND

There is an ever present desire to reduce components and improve the efficiencies of existing components, particularly in electronics. For automotive electronics, such improvements can decrease weight and size of a vehicle, thereby enhancing fuel economy.

SUMMARY

According to at least one embodiment, a power interface is provided with a first conductive busbar of a first junction box. A second conductive busbar of a second junction box is provided. A conductive fastener assembly connects the first busbar and the second busbar. A power feed is connected to the fastener assembly to power the first busbar and the second busbar to consequently power the first junction box and the second junction box.

According to at least one embodiment, a junction box assembly is provided with a conductive boss having a first contact surface and a second contact surface spaced apart from the first contact surface. A pair of threaded conductive studs each extends from one of the contact surfaces. A housing is overmolded onto the boss so that the first contact surface, the second contact surface, and the pair of studs are exposed. A printed circuit board (PCB) is oriented in the housing. A busbar is oriented in the housing in electrical communication with the PCB. The busbar has a conductive tab with an aperture formed therethrough. One of the pair of studs is received within the aperture and the contact tab is in electrical communication with one of the first contact surface and the second contact surface.

According to at least one embodiment, a power interface is provided with a conductive boss having a first contact surface and a second contact surface spaced apart from the first contact surface. A pair of threaded conductive studs each extends from one of the contact surfaces. A first housing is overmolded onto the boss so that the first contact surface, the second contact surface, and the pair of studs are exposed. A first PCB is oriented in the first housing. A first busbar is oriented in the first housing in electrical communication with the first PCB. The first busbar has a conductive tab with an aperture formed therethrough. One of the pair of studs is received within the aperture and the contact tab is in electrical communication with one of the first contact surface and the second contact surface. A second housing is provided with a second PCB oriented in the second housing. A second busbar is oriented in the second housing in electrical communication with the second PCB. The second busbar has a conductive tab extending out of the second housing with an aperture formed therethrough. The stud is received within the aperture in the second busbar conductive tab and the second busbar conductive tab is in electrical communication with the first busbar conductive tab. A power feed eyelet is connected to one of the pair of studs in contact with one of the contact surfaces to power the first busbar and the second busbar to consequently power the first junction box and the second junction box.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
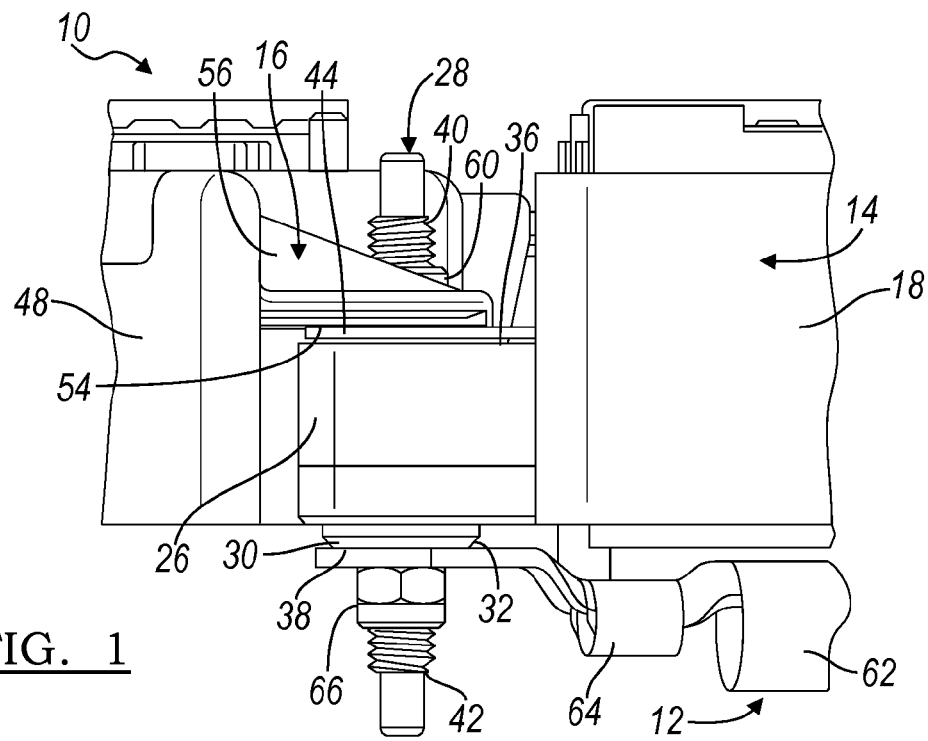
FIG. 1 is a partial side view of a power interface according to an embodiment.
Figure 2:
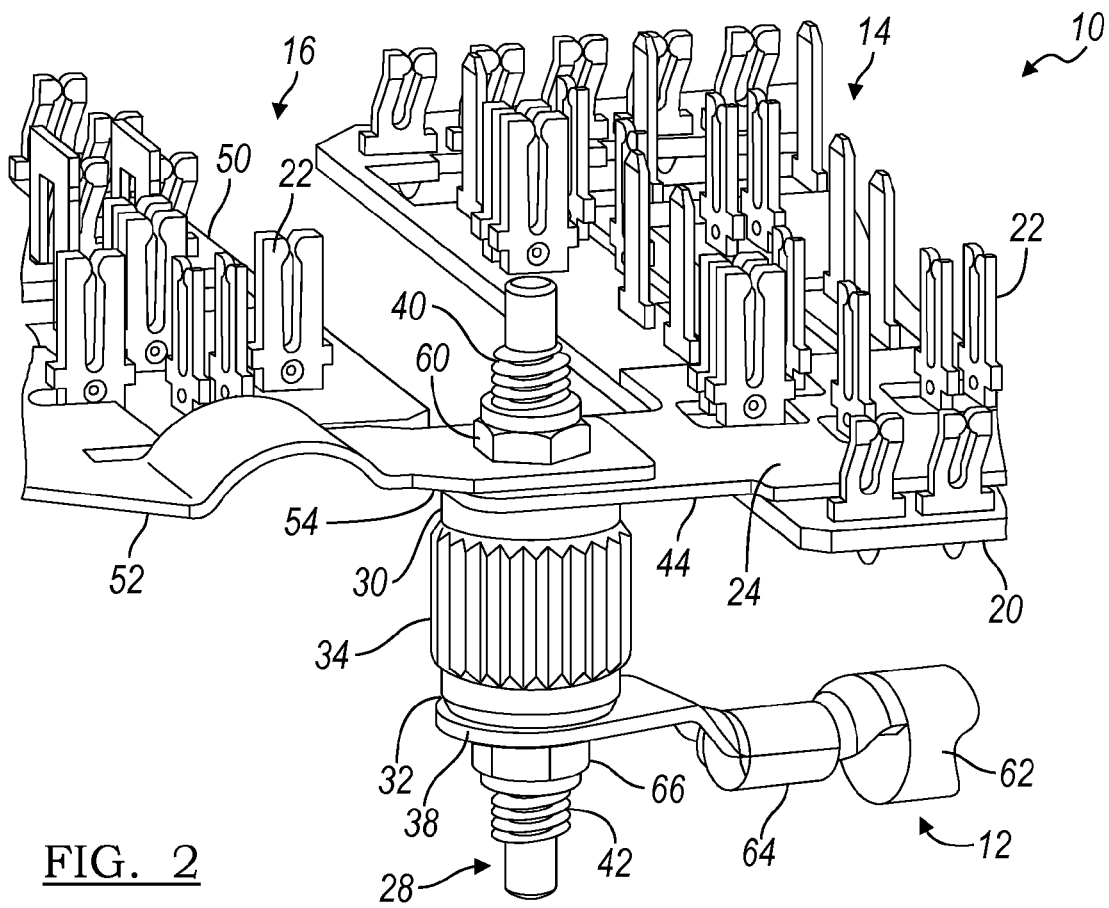
FIG. 2 is a partial perspective view of the power interface of FIG. 1, illustrated with housings removed.
Figure 3:
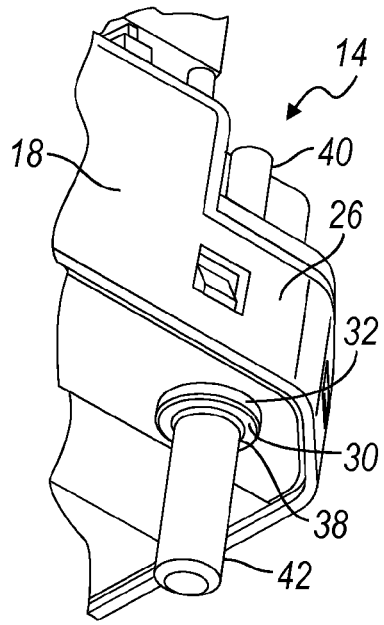
FIG. 3 is an enlarged partial perspective view of a portion of a junction box assembly of the power interface of FIG. 1.
Figure 4:
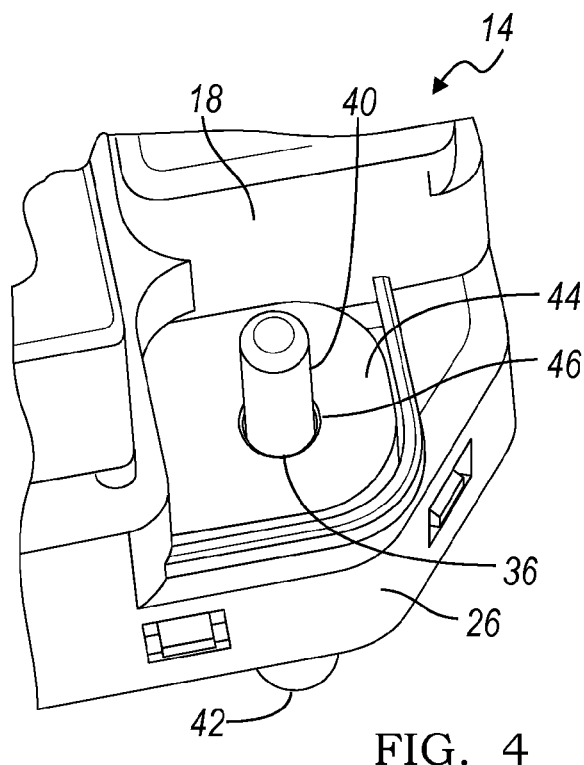
FIG. 4 is another enlarged partial perspective view of the portion of the junction box assembly of FIG. 3.

With reference to FIGS. 1 and 2, a power interface is illustrated and reference generally by numeral 10. For the depicted embodiment, the power interface 10 may be a vehicle power interface; however, the interface is not limited to any particular application. The power interface 10 is employed for distributing power from a power feed wire assembly 12 to a pair of junction box assemblies, referred to herein as a main junction box assembly 14 and a secondary junction box assembly 16. According to one embodiment, the junction box assemblies 14, 16 are fuse boxes for supplying power to various electrical vehicle components.

The main junction box assembly 14 includes a main housing 18, which retains a main printed circuit board (PCB) 20. The PCB 20 may include a plurality of electrical components, such as female terminals 22 for receipt of fuses, or the like. The housing 18 also includes a main conductive busbar 24 that is oriented primarily in the housing 18. The main busbar 24 is in electrical communication with the PCB 20 for conveying power to the PCB 20.

The housing 18 includes a fastener region 26 for supporting a fastener assembly 28. The fastener assembly 28 includes a conductive boss 30 that is secured within the housing 18 as illustrated in FIGS. 1-4. The boss 30 has a body 32 with an externally splined surface 34 for overmolding the housing 18 over the body 32. A pair of ends 36, 38 of the boss 30 is each exposed from the fastener region 26 to provide contact surfaces or shoulders. A pair of threaded studs 40, 42 each extends from one of the ends 36, 38 for fastening electrical contacts to the boss 30. The splined surface 34 resists rotation of the boss 30 when a torque is applied to one of the threaded studs 40, 42.

The main busbar 24 includes a contact tab 44 with an aperture 46 formed therein. The contact tab 44 extends out of the housing 18; and engages the contact surface of the end 36 of the boss 30. The aperture 46 is placed over the threaded stud 40 to retain the main busbar 24 relative to the fastener assembly 28.

Figure 5:
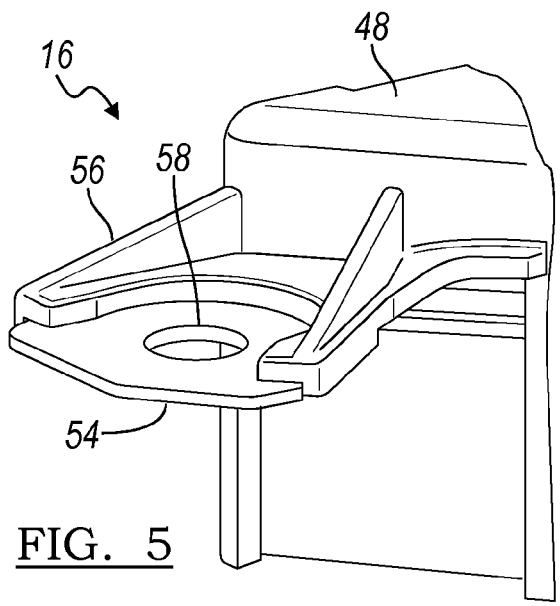
FIG. 5 is an enlarged partial perspective view of a portion of another junction box assembly of the power interface of FIG. 1.

Referring now to FIGS. 1, 2 and 5, the secondary junction box assembly 16 includes a secondary housing 48 with a secondary PCB 50. A secondary busbar 52 is oriented in the secondary housing 48. The secondary busbar 52 includes a contact tab 54 that extends out of the housing 48. The secondary housing 48 may also include a bracket 56 for providing additional support to the secondary busbar contact tab 54. The secondary busbar contact tab 54 also includes an aperture 58 that receives the threaded stud 40 such that the secondary busbar contact tab 54 is in electrical contact with the main busbar contact tab 44.

A threaded nut 60 is provided on the stud 40 in engagement with the secondary busbar contact tab 54 for pressing the secondary busbar contact tab 54 against the main busbar contact tab 44, and consequently pressing the main busbar contact tab 44 against shoulder 36 of the boss 30. The threaded nut 60 retains the main busbar 24 and the secondary busbar 52 in electrical connection with the fastener assembly 28 to ensure electrical connection therebetween.

The power feed wire assembly 12 includes a power wire 62 connected to an eyelet 64. The eyelet 64 is secured to the second threaded stud 42 by a second threaded nut 66 thereby retaining the eyelet in electrical communication with the second shoulder 38 of the boss 30. By utilizing one fastener assembly 28 for two junction box assemblies 14, 16, only one power feed wire assembly 12 is employed.

Thus, duplication of power feed wire assemblies 12 and fastener assemblies 28 is avoided thereby reducing costs in additional components, while reducing the overall size and weight. The removal of a redundant connection increases efficiencies of the connection while also simplifying manufacturing processes.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A power interface comprising:
   a first conductive busbar of a first junction box;
   a second conductive busbar of a second junction box;
   a conductive fastener assembly connecting the first busbar and the second busbar; and
   a power feed connected to the fastener assembly to power the first busbar and the second busbar to consequently power the first junction box and the second junction box.

2. The power interface of claim 1 wherein the power feed is further defined as only one power feed.

3. The power interface of claim 1 wherein the first busbar comprises a contact tab; and
   wherein the second busbar comprises a contact tab in contact with the first busbar contact tab.

4. The power interface of claim 3 wherein the first busbar contact tab includes an aperture formed therethrough; and
   wherein the second busbar contact tab includes an aperture formed therethrough aligned with the aperture in the first busbar contact tab.

5. The power interface of claim 4 wherein the fastener assembly comprises a stud extending through the aperture in the first busbar contact tab and the aperture in the second busbar contact tab.

6. The power interface of claim 5 wherein the stud is threaded.

7. The power interface of claim 6 wherein the fastener assembly further comprises a threaded nut engaged upon the threaded stud for retention of the first busbar contact tab and the second busbar contact tab.

8. The power interface of claim 7 wherein the fastener assembly further comprises a shoulder connected to the stud; and
   wherein the threaded nut engages only one of the first busbar contact tab and the second busbar contact tab, while pressing only the other of the first busbar contact tab and the second busbar contact tab into engagement with the shoulder.

9. The power interface of claim 8 wherein the fastener assembly further comprises a boss connected to the stud thereby providing the shoulder, wherein an external body of the boss is splined.

10. The power interface of claim 9 further comprising a first junction box assembly, the first junction box assembly comprising:
    a housing overmolded onto the splined boss of the fastener assembly, wherein the first busbar is at least partially oriented in the housing; and
    a printed circuit board (PCB) oriented in the housing in electrical communication with the first busbar.

11. The power interface of claim 10 further comprising a second junction box assembly, the second junction box assembly comprising:
    a housing, wherein the second busbar is at least partially oriented in the second junction box housing; and
    a PCB oriented in the second junction box housing in electrical communication with the second busbar.

12. The power interface of claim 9 wherein the stud is further defined as a first stud;
    wherein the fastener assembly further comprises a second stud extending from the boss; and
    wherein the power feed comprises an eyelet mounted to the second stud.

13. The power interface of claim 12 wherein the second stud is threaded.

14. The power interface of claim 13 wherein the fastener assembly further comprises a second threaded nut engaged upon the second threaded stud for retention of the eyelet and to maintain contact of the eyelet with another shoulder on the boss.

15. The power interface of claim 12 wherein the eyelet is further defined as only one eyelet.

16. The power interface of claim 12 wherein the power feed further comprises a wire connected to the eyelet.

17. The power interface of claim 16 wherein the wire is further defined as only one wire.

18. A junction box assembly comprising:
    a conductive boss having a first contact surface and a second contact surface spaced apart from the first contact surface;
    a pair of threaded conductive studs each extending from one of the contact surfaces;
    a housing overmolded onto the boss so that the first contact surface, the second contact surface, and the pair of studs are exposed;
    a printed circuit board (PCB) oriented in the housing; and
    a busbar oriented in the housing in electrical communication with the PCB, the busbar having a conductive tab with an aperture formed therethrough, wherein one of the pair of studs is received within the aperture and the contact tab is in electrical communication with one of the first contact surface and the second contact surface.

19. A power interface comprising:
a first junction box assembly according to claim 18, wherein the housing is further defined as a first housing, the PCB is further defined as a first PCB, and the busbar is further defined as a first busbar; and
a second junction box assembly comprising:
   a second housing,
   a second PCB oriented in the second housing, and
   a second busbar oriented in the second housing in electrical communication with the second PCB, the second busbar having a conductive tab extending out of the second housing with an aperture formed therethrough, wherein the stud is received within the aperture in the second busbar conductive tab and the second busbar conductive tab is in electrical communication with the first busbar conductive tab.

20. A power interface comprising:
a conductive boss having a first contact surface and a second contact surface spaced apart from the first contact surface;
a pair of threaded conductive studs each extending from one of the contact surfaces;
a first housing overmolded onto the boss so that the first contact surface, the second contact surface, and the pair of studs are exposed;
a first printed circuit board (PCB) oriented in the first housing;
a first busbar oriented in the first housing in electrical communication with the first PCB, the first busbar having a conductive tab with an aperture formed therethrough, wherein one of the pair of studs is received within the aperture and the contact pad is in electrical communication with one of the first contact surface and the second contact surface;
a second housing;
a second PCB oriented in the second housing;
a second busbar oriented in the second housing in electrical communication with the second PCB, the second busbar having a conductive tab extending out of the second housing with an aperture formed therethrough, wherein the stud is received within the aperture in the second busbar conductive tab and the second busbar conductive tab is in electrical communication with the first busbar conductive tab; and
a power feed eyelet connected to one of the pair of studs in contact with one of the contact surfaces to power the first busbar and the second busbar to consequently power the first junction box and the second junction box.

\* \* \* \* \*